US006832315B1

(12) United States Patent
Waltham

(10) Patent No.: US 6,832,315 B1
(45) Date of Patent: Dec. 14, 2004

(54) METHOD OF LABELLING AN ARTICLE

(75) Inventor: Richard Waltham, Chippenham (GB)

(73) Assignee: Thorn Secure Science Limited, Wilshire (GB)

(*) Notice: Subject to any disclaimer, the term of this patent is extended or adjusted under 35 U.S.C. 154(b) by 0 days.

(21) Appl. No.: 09/554,127

(22) PCT Filed: Nov. 9, 1998

(86) PCT No.: PCT/GB98/03337

§ 371 (c)(1),
(2), (4) Date: Jun. 15, 2000

(87) PCT Pub. No.: WO99/24942

PCT Pub. Date: May 20, 1999

(30) Foreign Application Priority Data

| Nov. 10, 1997 | (GB) | ............................................. 9723732 |
| Apr. 7, 1998 | (GB) | ............................................. 9807341 |

(51) Int. Cl.[7] ................................................ H04L 9/00
(52) U.S. Cl. ...................... 713/179; 708/680; 708/683; 708/700
(58) Field of Search ................................ 358/1.18, 434; 396/319; 341/55; 348/642; 708/493, 100, 200, 490, 670, 680, 683, 700; 235/462.05; 375/240; 710/65; 382/115; 713/150, 168, 176, 179

(56) References Cited

U.S. PATENT DOCUMENTS

| 4,645,916 A | | 2/1987 | Raisleger |
| 5,136,618 A | * | 8/1992 | Wright, Jr. .................... 375/240 |
| 5,325,138 A | * | 6/1994 | Nagata ......................... 396/319 |
| 5,473,327 A | * | 12/1995 | Ray et al. ...................... 341/55 |
| 5,576,532 A | | 11/1996 | Hecht |
| 5,621,864 A | * | 4/1997 | Benade et al. .............. 358/1.18 |
| 5,745,796 A | * | 4/1998 | Hancock ....................... 710/65 |
| 5,796,090 A | * | 8/1998 | Pavlidis et al. ......... 235/462.05 |
| 5,822,233 A | * | 10/1998 | Kawasaki .................... 708/493 |
| 5,841,886 A | * | 11/1998 | Rhoads ........................ 382/115 |
| 5,905,800 A | * | 5/1999 | Moskowitz et al. .......... 380/28 |
| 6,122,071 A | * | 9/2000 | Yoshida ....................... 358/434 |
| 6,268,889 B1 | * | 7/2001 | Koori ......................... 348/642 |

FOREIGN PATENT DOCUMENTS

| GB | 1331604 | | 9/1973 |
| GB | 1392040 | | 4/1975 |
| GB | 2021835 | A | 12/1979 |
| GB | 2272092 | A | 5/1994 |
| GB | 2272560 | A | 5/1994 |
| GB | 2309568 | A | 7/1997 |

* cited by examiner

*Primary Examiner*—Emmanuel L. Moise
*Assistant Examiner*—Christopher Revak
(74) *Attorney, Agent, or Firm*—Herbert Dubno

(57) ABSTRACT

A method of labelling an article, including a) choosing a first character string comprising an identification number chosen to represent an article or a given class of articles, the character string comprising two or more characters, b) expressing each character in said character string as a binary number having seven or more binary digits, c) storing a sequence of binary numbers corresponding to said character string in a data store, and d) attaching the data store to, or incorporating the data store in, an article. The sequence of binary numbers is preferably generated by multiplication of the identification number by an integer, followed by conversion of the resultant number into a base 84 number. The data store preferably comprises anisotropic magnetic particles having a permanent non-random orientation in predetermined spaced regions.

9 Claims, 1 Drawing Sheet

METHOD OF LABELLING AN ARTICLE

Figure 1:
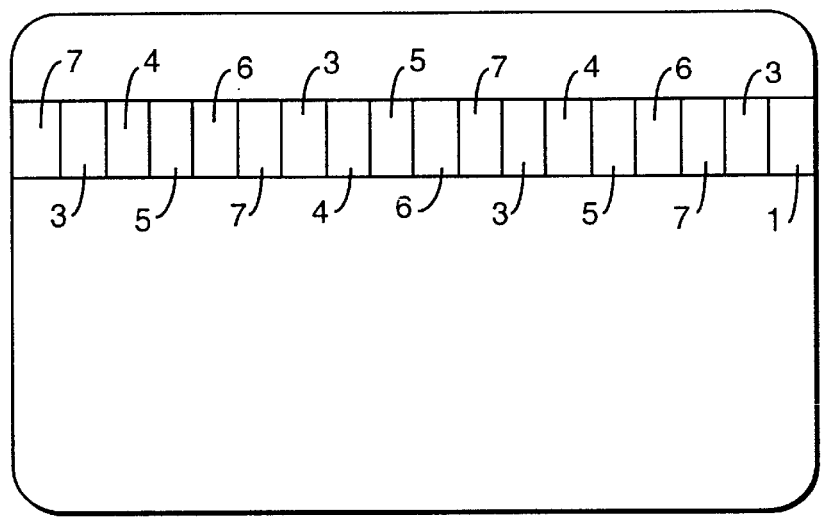

This invention relates to a method of labelling an article, and to a method of authentication for an article. It also relates to an identification means or label for use in such a method.

Magnetic tape having a permanent pattern of a detectable magnetic quantity is known from GB A 1331604, which is incorporated herein by reference, and GB A 2309568. Such tape is available from Thorn Secure Science Limited under the UK registered trade mark "WATERMARK" tape, and is used as an identification or authentication means on articles of value such as bank cards or credit cards.

At the present state of the art the maximum data packing densities used in volume manufacture of this tape is 39 bits per inch (1.53 bits per mm) using industry standard F2F coding. The data format used in Watermark tape requires marker portions, known as "sentinels", with a binary digit string between successive sentinels. Each sentinel comprises 10 bits, with the data between sentinels typically comprising 60 bits (12 characters each comprising 5 bits). The data between sentinels may be incrementing or non-incrementing. If the data is non-incrementing, then the data stored on the tape is periodic, having a period of 70 binary digits. At a data packing density of 1.3 bits per mm, this implies that over 53 mm of tape must be applied to an article of value in order to identify it correctly, and if part of the tape gets damaged, or the read head bounces at the edge of the label then there is no redundancy, and so the data cannot be read correctly. Thus Watermark tape is not particularly convenient for use on small articles or documents of value.

One way to reduce the pitch of data on such tape would be to decrease the length of the sentinel. In GB-A-2 021 835 a 5 bit sentinel and eight 5 bit characters was suggested. However, such a scheme has been found not to be practical because of significant interaction between the sentinel and the data, resulting in unacceptable read errors. Another drawback with this scheme is that the data can only be read in the forward direction and not in the reverse direction. To overcome this problem a sentinel having 10 bits has been employed for many years. This normally includes a long string of binary 1's, such as 00111 11101 or 10111 11000. When combined with 5 bit data characters which use 4 bits to represent decimal characters 0 to 9 and the 5th bit for "odd" parity this makes sure that the sentinel cannot occur in the twelve 5 bit data characters.

According to a first aspect of the invention, there is provided a method of labelling an article as claimed in claims 1–12. According to a second aspect of the invention there is provided an article so labelled as claimed in claim 15.

According to a third aspect of the invention, there is provided an identification means for labelling an article as claimed in claims 16–18.

According to a fourth aspect of the present invention there is provided a method of identifying an article as claimed in claims 13 and 14.

Figure 2:
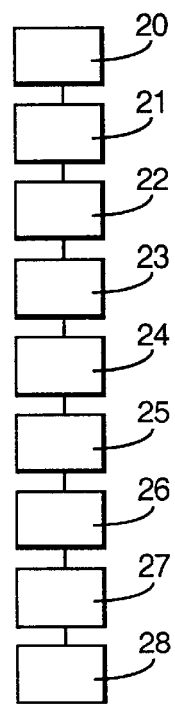
Figure 3:
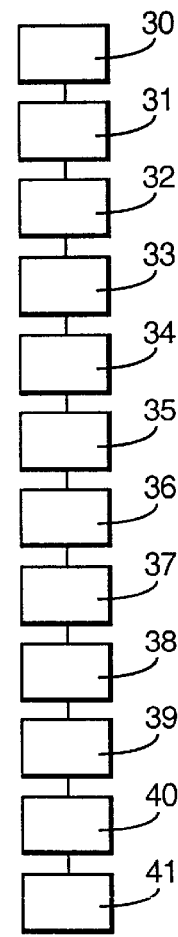

Embodiments of the invention will now be described, by way of example only, with reference to the accompanying diagrammatic drawings, in which FIG. 1 shows an article of value labelled according to the invention, FIG. 2 shows a block diagram of a method of identification according to the invention, and FIG. 3 shows a block diagram of a method of authentication according to the invention.

In FIG. 1, an identification means (1) labelling an article (2) is shown. The identification means comprises a data-carrying layer (in the present example a magnetic tape laminated to the article of value) having a permanent pattern of a detectable magnetic property. The data being carried by the layer comprising a sequence of binary digits, the sequence having a period of less than 64 binary digits, and having a length greater than or equal to one period. In the example shown in FIG. 1 the data comprises marker portions or sentinels (3) with four other portions or characters (4, 5, 6, 7) located between successive marker portions. Each sentinel comprises the binary digit string, in the present example 1010000. Other binary digit strings can be used as an alternative, for example 0010100, or 0101111, etc., but 1010000 has been chosen because it is one of the strings which is least likely to be confused with other binary digit (bit) strings when read.

Each of the other characters comprises a 7 bit number. Although in the present example there are four characters, strings having 2 or more characters may be used if desired. The four character string (4, 5, 6, 7), comprising 28 bits, is chosen to represent a given class of articles, for example a document of value such as a share certificate or gift voucher issued by a company. In the present example these four characters give 2,214,841 possible different "first" character strings (i.e. "key differs"), as will be explained below. The more characters in the initial character string, the greater the number of key differs, but the longer the initial character string the longer the final magnetic record.

The "first" character string in the present example comprises four characters. Each of the four characters is represented by a 7 bit number which is found from a predetermined look-up table such that the marker character (1010000) does not appear if the sequence of bits is read in either direction, except at a marker. The marker character is preferably not palindromic so that when the data is read in the forward or the reverse direction a different pattern in seen, such that the reading apparatus can work out which way up the character string has been presented to it in use. Each of the characters, being 7 bits in length, can take 128 potential values. The value 1010000 and its reverse 0000101 must be excluded as these would be confused with a marker. The number 0101xxx must also be excluded as it could combine with xxxx000 in an adjacent character to produce a "phantom" marker. Numbers containing long runs of zeros must also be avoided, as this can confuse F2F decoding and/or the ability of a reader to differentiate between the method of the present invention and that of normal "WATERMARK" tape. The numbers which must be excluded at characters 2, 3 and 4 are shown in Table 1, whilst additional numbers which must be excluded at the first character position are shown in Table 2. The actual complete look up table used in the present embodiment is shown in Table 3.

TABLE 1

Codewords excluded at characters 2, 3 & 4
D = decimal value of the excluded codeword

| D | Exclusion | D | Exclusion | D | Exclusion |
|---|---|---|---|---|---|
| 0 | xx(000-0000000) | 26 | 001(1010-000)xx | 65 | xx(10-10000)01 |
| 1 | xx(0000-000000)1 | 32 | xx(1-010000)0 | 66 | xx(10-10000)10 |
| 2 | x(00000-00000)10 | 33 | xx(1-010000)1 | 67 | xx(10-10000)11 |
| 3 | x(00000-00000)11 | 40 | xx(000-0101)000 | 74 | 100(1010-000)xx |
| 4 | xx(101-0000)100 | 41 | xx(000-0101)001 | 80 | (1010000) |
| 5 | (0000101) | 42 | xx(000-0101)010 | 84 | 10(10100-00)xx |
| 6 | xx(101-0000)110 | 43 | xx(000-0101)011 | 90 | 101(1010-000)xx |
| 7 | xx(101-0000)111 | 44 | xx(000-0101)100 | 96 | 110(0000-101)xx |
| 10 | 000(1010-000)xx | 45 | xx(000-0101)101 | 97 | 11(00001-01)xx |
| 11 | xx(0-000101)1 | 46 | xx(000-0101)110 | 104 | 1(101000-0)xx |
| 16 | 001(0000-101)xx | 47 | xx(000-0101)111 | 106 | 110(1010-000)xx |
| 20 | 00(10100-00)xx | 48 | 011(0000-101)xx | 112 | 111(0000-101)xx |
| 21 | 001(1010-000)xx | 52 | 01(10100-00)xx | 116 | 11(10100-00)xx |
| 22 | xx(00-00101)10 | 58 | 011(1010-000) | 122 | 111(1010-000)xx |
| 23 | xx(00-00101)11 | 64 | 100(0000-101)xx | | |

TABLE 2

Additional codewords excluded at character 1

| D | Exclusion | D | Exclusion | D | Exclusion |
|---|---|---|---|---|---|
| 81 | 101(0000-101)0001 | 87 | 101(0000-101)0111 | 93 | 101(0000-101)1101 |
| 82 | 101(0000-101)0010 | 88 | 101(0000-101)1000 | 94 | 101(0000-101)1110 |
| 83 | 101(0000-101)0011 | 89 | 101(0000-101)1001 | 95 | 101(0000-101)1111 |
| 85 | 101(0000-101)0101 | 91 | 101(0000-101)1011 | | |
| 86 | 101(0000-101)0110 | 92 | 101(0000-101)1100 | | |

TABLE 3

Binary Table

| n | b | D | H | n | b | D | H |
|---|---|---|---|---|---|---|---|
| | 0000000 | 0 | 0 | 16 | 0100010 | 34 | 22 |
| | 0000001 | 1 | 1 | 17 | 0100011 | 35 | 23 |
| | 0000010 | 2 | 2 | 18 | 0100100 | 36 | 24 |
| | 0000011 | 3 | 3 | 19 | 0100101 | 37 | 25 |
| | 0000100 | 4 | 4 | 20 | 0100110 | 38 | 26 |
| | 0000101 | 5 | 5 | 21 | 0100111 | 39 | 27 |
| | 0000110 | 6 | 6 | | 0101000 | 40 | 28 |
| | 0000111 | 7 | 7 | | 0101001 | 41 | 29 |
| 0 | 0001000 | 8 | 8 | | 0101010 | 42 | 2A |
| 1 | 0001001 | 9 | 9 | | 0101011 | 43 | 2B |
| | 0001010 | 10 | A | | 0101100 | 44 | 2C |
| | 0001011 | 11 | B | | 0101101 | 45 | 2D |
| 2 | 0001100 | 12 | C | | 0101110 | 46 | 2E |
| 3 | 0001101 | 13 | D | | 0101111 | 47 | 2F |
| 4 | 0001110 | 14 | E | | 0110000 | 48 | 30 |
| 5 | 0001111 | 15 | F | 22 | 0110001 | 49 | 31 |
| | 0010000 | 16 | 10 | 23 | 0110010 | 50 | 32 |
| 6 | 0010001 | 17 | 11 | 24 | 0110011 | 51 | 33 |
| 7 | 0010010 | 18 | 12 | | 0110100 | 52 | 34 |
| 8 | 0010011 | 19 | 13 | 25 | 0110101 | 53 | 35 |
| | 0010100 | 20 | 14 | 26 | 0110110 | 54 | 36 |
| | 0010101 | 21 | 15 | 27 | 0110111 | 55 | 37 |
| | 0010110 | 22 | 16 | 28 | 0111000 | 56 | 38 |
| | 0010111 | 23 | 17 | 29 | 0111001 | 57 | 39 |
| 9 | 0011000 | 24 | 18 | | 0111010 | 58 | 3A |
| 10 | 0011001 | 25 | 19 | 30 | 0111011 | 59 | 3B |
| | 0011010 | 26 | 1A | 31 | 0111100 | 60 | 3C |
| 11 | 0011011 | 27 | 1B | 32 | 0111101 | 61 | 3D |
| 12 | 0011100 | 28 | 1C | 33 | 0111110 | 62 | 3E |
| 13 | 0011101 | 29 | 1D | 34 | 0111111 | 63 | 3F |
| 14 | 0011110 | 30 | 1E | | 1000000 | 64 | 40 |
| 15 | 0011111 | 31 | 1F | | 1000001 | 65 | 41 |
| | 0100000 | 32 | 20 | | 1000010 | 66 | 42 |
| | 0100001 | 33 | 21 | | 1000011 | 67 | 43 |

TABLE 3-continued

Binary Table

| n | b | D | H |
|---|---|---|---|
| 35 | 1000100 | 68 | 44 |
| 36 | 1000101 | 69 | 45 |
| 37 | 1000110 | 70 | 46 |
| 38 | 1000111 | 71 | 47 |
| 39 | 1001000 | 72 | 48 |
| 40 | 1001001 | 73 | 49 |
|  | 1001010 | 74 | 4A |
| 41 | 1001011 | 75 | 4B |
| 42 | 1001100 | 76 | 4C |
| 43 | 1001101 | 77 | 4D |
| 44 | 1001110 | 78 | 4E |
| 45 | 1001111 | 79 | 4F |
|  | 1010000 | 80 | 50 |
| *71* | *1010001* | 81 | 51 |
| *72* | *1010010* | 82 | 52 |
| *73* | *1010011* | 83 | 53 |
|  | 1010100 | 84 | 54 |
| *74* | *1010101* | 85 | 55 |
| *75* | *1010110* | 86 | 56 |
| *76* | *1010111* | 87 | 57 |
| *77* | *1011000* | 88 | 58 |
| *78* | *1011001* | 89 | 59 |
|  | 1011010 | 90 | 5A |
| *79* | *1011011* | 91 | 5B |
| *80* | *1011100* | 92 | 5C |
| *81* | *1011101* | 93 | 5D |
| *82* | *1011110* | 94 | 5E |
| *83* | *1011111* | 95 | 5F |
|  | 1100000 | 96 | 60 |
|  | 1100001 | 97 | 61 |
| 46 | 1100010 | 98 | 62 |
| 47 | 1100011 | 99 | 63 |
| 48 | 1100100 | 100 | 64 |
| 49 | 1100101 | 101 | 65 |
| 50 | 1100110 | 102 | 66 |
| 51 | 1100111 | 103 | 67 |
|  | 1101000 | 104 | 68 |
| 52 | 1101001 | 105 | 69 |
|  | 1101010 | 106 | 6A |
| 53 | 1101011 | 107 | 6B |
| 54 | 1101100 | 108 | 6C |
| 55 | 1101101 | 109 | 6D |
| 56 | 1101110 | 110 | 6E |
| 57 | 1101111 | 111 | 6F |
|  | 1110000 | 112 | 70 |
| 58 | 1110001 | 113 | 71 |
| 59 | 1110010 | 114 | 72 |
| 60 | 1110011 | 115 | 73 |
|  | 1110100 | 116 | 74 |
| 61 | 1110101 | 117 | 75 |
| 62 | 1110110 | 118 | 76 |
| 63 | 1110111 | 119 | 77 |
| 64 | 1111000 | 120 | 78 |
| 65 | 1111001 | 121 | 79 |
|  | 1111010 | 122 | 7A |
| 66 | 1111011 | 123 | 7B |
| 67 | 1111100 | 124 | 7C |
| 68 | 1111101 | 125 | 7D |
| 69 | 1111110 | 126 | 7E |
| 70 | 1111111 | 127 | 7F | n = input, un-encoded value
(b, D, H) = output, encoded value in binary, decimal and hex respectively.

Binary numbers shown in bold in Table 3 are excluded for all character places. Binary numbers shown in italics in Table 3 are excluded from character position 1. It will be noted that the numbers n in table 3 do not form a monotonically increasing sequence. This is permissible as it is a look up table. Thus any value could appear at any place in the look up table as long as the place is the same for both the encode and decode operations.

Only 84 of the possible 128 possible values available with a 7 bit string are used in the encode direction. The 44 excluded values become parity errors if found in the reverse (decode) application of the look-up table shown as Table 3.

To avoid generating phantom markers, values of n above 70 must be avoided in the character 1 position. This is done by keeping the maximum possible number used to 2,214,840 or less. The total number of possible combinations or "key differs" is (71×84×84×84)/19, which rounds down to 2,214,841.

Having now described in some detail what format the data carried by the identification means takes in the preferred embodiment, the method of providing the data will be explained.

First, the person desiring to label the article of value must choose a characters string from the 2,214,841 combinations possible when using 4 characters from Table 3. In the present example this will be a decimal number, which we shall call N, which lies between zero and 2,214,841. This step is shown as block 20 in FIG. 2.

The steps in the method are then as follows, with steps a to h being represented in FIG. 2 by blocks 21 to 28 respectively:— a). Check that N lies between zero and 2,214,841.

b). Multiply N by a numerical factor, in the present example the integer 19. This factor is known as the longitudinal redundancy check factor, or LRC.

c). Convert the result (i.e. 19N) to the number base of the look up table (84 in the present example) giving a 4 digit number in base 84, d). Take this 4 digit number and using the look up table of Table 3 encode the digits sequentially into characters 1–4, each character comprising a 7 bit number, e). Add the marker 101000 to one end of the data, f). Send the resulting 35 bit sequence through a circuit of known form which applies F2F encoding to the binary data, g). Embody the code as a permanent structure of a detectable magnetic property in an identification means as previously described, h). Repeat steps f) and g) to provide a periodic sequence of binary digits in the identification means.

A specific example of the above method will now be provided. First, the identification number 1234567 is chosen (being a decimal number between 0 and 2214841). This number is then multiplied by the integer 19 to give 23456773. To convert to a base 84 number, this is divided by 84, leaving the number 279247 and the remainder 25. Dividing 279247 by 84 gives 3324, remainder 31. Dividing 3324 by 84 gives 39 remainder 48. The final remainder (which in the present example should be less than 71) is 39. The look-up table of Table 3 is then used to convert the remainders to bit patterns as follows:—

39=1001000

48=1100100

31=0111100

25=0110101.

The sentinel 1010000 is placed at one end of the bit pattern, and the bit pattern is recorded onto an identification means, such as for example magnetic tape, the final bit pattern at the end of step (e) above reading:—

1010000 1001000 1100100 0111100 0110101.

This completes the encoding part of the labelling or identification method. The identification means is then applied to or incorporated in an article of value such as a document of value. This may be achieved by simply laminating the identification means, in the present example magnetic tape, to the article, or by a transfer method in which an adhesive layer is applied to the surface of the tape, the article affixed to this adhesive layer, and the substrate tape is removed leaving the upper layer of what was originally the tape bonded to the surface of the article of value.

In order to authenticate the article of value, the identification means applied to the article as described above must be read and decoded. This may be performed according to the following method, which is represented in FIG. 3 as a flow diagram in which blocks 30 to 41 correspond to the following steps a–l respectively:— a) Move a reader or scanning means past the identification means, or vice versa, and apply (if desired) known media authentication techniques such as those disclosed in GB 2035659 or EP 93916121, b) Apply a F2F decoding algorithm to the scanned data, c) Test for the presence of leading or trailing zeros, or other features indicating the presence of another data format such as the usual "WATERMARK" data format, if found decode as that format. If not found, continue as described below, d) Find 35 contiguous bits which are free from read or F2F decode errors, using known error detection techniques, and/or authentication techniques, e) Check for errors in the 35 contiguous bits by storing them in a shift register such as, for example, a ring or rotating barrel shifter, and rotate them by 35 bits (in steps of 1 bit) in both directions, checking that in total in both directions the 35 bits contain exactly one marker or sentinel—any other result signifying the presence of an error, f) Arrange the digits by rotation and, if necessary, by inverting the order of the digits, such that the marker appears at the head of the character string and character 4 appears at the tail, g) Remove the bits corresponding to the marker, leaving 28 bits corresponding to data consisting of 4 characters, each character comprising 7 bits, h) Apply the look-up table of Table 3 in reverse to each of the 4 characters to give 4 numbers in base 84. If the look-up table does not contain an entry matching one or more of the numbers this indicates the presence of an error, i) Convert the number to a number base which matches the desired output, such as, for example, base 10 in the present example, j) Divide the number obtained in step i above by the LRC (19 in the present example), and reject as erroneous if the remainder is not zero.

k) Compare the result with N, the number characteristic of a genuine article of value. If they are the same, then the article is genuine, l) Signal the result of this comparison. The result signalled may comprise for example a report of the identification number, confirmation that the extracted identification number matches a predetermined number, or a report that authentication failed due to a media authentication error or due to a data format error.

In the above encode and decode sequence, it is not convenient to use a binary checksum as an error protection feature. The use of multiplication and division by the LRC factor has similar error protection properties to that of a checksum. A random error on, for example, a module 19 multiplication and division error protection scheme has only a 1 in 19 chance of producing a codeword which passes the test.

The reasons for choosing the LRC factor to be 19 are as follows. The LRC factor chosen should share as few common factors as possible with the number base of the look-up table (84 in the present example). Being a prime number a little above 16 makes 19 a good candidate. It would be possible to use LRC factors of 17 or 13, these would provide slightly worse error protection but numbers which are slightly easier to work with. It would also in theory be possible to use the numbers 16, 15, or 14—however, this would make for rather more interaction between the LRC factor and the number base of the look up table, and hence rather more exclusions from the look-up table.

In addition to the 19 multiply/divide LRC factor, substantial error detection is achieved in the present method by use of the character look up table and by the F2F coding.

The factor of 19 provides a similar level of protection to that used in most large magnetic stripe schemes. If a new application required the error protection to be increased fifty-fold then it will be obvious to those skilled in the art that the LRC factor in the above example can be increased to (say) 1000, which will then reduce the available "key differs" to 42,081.

Although in the above example 4 characters each comprising seven bits are used, more characters or fewer characters may be employed in the scheme if desired. Each character may comprise six or more digits, preferably seven or more digits. The digits may be expressed in a predetermined number base which need not be equal to 2 as in the above example.

The use of the method described above enables an identification means or label having a length of 27 mm to be produced having 2,214,841 possible "key differs". In comparison, a standard "WATERMARK" tape record with similar key differs has at least a 45 mm length, assuming that both are encoded at 1.53 bits per mm.

It is anticipated that this invention will find wide application in areas such as:— a) Provision of sets of identical tokens, such as event tickets, gift tokens, share certificates, promissory notes, bank notes, and signatures to authenticate that a given organisation or person has stamped or sealed the document.

b) Cost critical applications: an important factor in cost control is minimisation of surface area. This is also desirable for aesthetic considerations.

As a further aspect of the invention, the above method may be applied in an analogous way to the case where the successive character strings having a sentinel or marker therebetween are not identical but increment or decrement. In this case the binary digit sequence will not in general be periodic. In this case the digit sequence will be applied to the article, for example a document, in a registered position so that the marker is in a known position on the document. This slightly simplifies the decoding described above, which no longer requires the rotating barrel shifter. This registration process is known in the industry, although in this particular embodiment the registration can be sensed by magnetic means. More conventional optical sensing can be used at registration if suitable optical features are included during the manufacture of the magnetic foil. In general, application needing incrementing numbers are likely to need more than four of the 7 bit characters. For example, if the embodiment shown in the example is extended from 35 to 63 bits it generates $1.1 \times 10^{14}$ "key differs", whereas "WATERMARK" would require 90 bits to encode this. Thus the present invention provides the advantage over the prior art that more "key differs" can be provided using a shorter length of tape.

What is claimed is:

1. A method of labeling an article, comprising:

generating a first character string comprising two or more characters as an identifier;

coding said first character string to give an identification number comprising seven or more binary digits for each character;

forming a sequence of binary digits comprising a plurality of said identification numbers, having identical marker portions therebetween to increase a number of different keys possible from a given length of said identification number;

storing part of said sequence of binary digits corresponding to one or more identical said identification numbers in a data store, said data store comprising a layer of material having a permanent pattern of a detectable magnetic property; and at least one of attaching the data store to an article and incorporating the data store in an article;

wherein said first character string comprises a decimal number, and said coding of said decimal number to give said identification number comprises:

multiplication of said decimal number by an integer to form a resultant number;

conversion of said resultant number into a number base; and conversion of each digit of said number base to binary, resulting in said binary digits.

2. A method of labeling an article, comprising:

generating a sequence of different first character strings, each string comprising two or more characters as an identifier;

coding each of said first character strings to give a respective identification number, said identification number comprising seven or more binary digits for each character;

forming a sequence of binary digits comprising said respective identification numbers and identical marker portions therebetween to increase a number of different keys possible from a given length of identification number;

storing part of said sequence of binary digits corresponding to one or more identification numbers in a data store, said data store comprising a layer of material having a permanent pattern of a detectable magnetic property; and at least one of attaching the data store to and incorporating the data store in an article;

wherein said first character string comprises a decimal number, and said coding of said decimal number to give said respective identification number comprises:

multiplication of said decimal number by an integer to form a resultant number;

conversion of said resultant number into a number base; and conversion of each digit of said number base to binary, resulting in said binary digits.

3. The method of labeling an article according to claim 2, wherein:

said given number base is base 84.

4. The method of labeling an article according to claim 2, wherein:

said conversion of said resultant number into said number base is performed using a look-up table, said look-up table lacking binary digit strings which may cause confusion with said marker portion.

5. The method of labeling an article according to claim 4, wherein:

said first character string is obtained by decoding said given binary digit string; and said decoding comprising using said look-up table in reverse and dividing a number derived therefrom by said integer.

6. The method of labeling an article according to claim 2, wherein:

said integer lies in a range 13 to 23.

7. The method of labeling an article according to claim 2, wherein:

said integer is equal to 19.

8. The method of labeling an article according to claim 2, wherein:

said data store comprises a layer of anisotropic magnetic particles having a permanent non-random orientation in predetermined spaced regions.

9. The method of labeling an article according to claim 2, further comprising:

optionally performing known media authentication tests;

reading said sequence of binary digits in either direction;

extracting from said sequence of binary digits said first character string;

extracting from said character string said identification number; and optionally comparing said extracted identification number with a predetermined identification number;

signaling a result of said comparison of said extracted identification number with said predetermined identification number.

* * * * *